Jan. 10, 1961  A. S. McKAY  2,967,937
METHOD AND APPARATUS FOR MEASURING THICKNESS
Filed Dec. 16, 1955
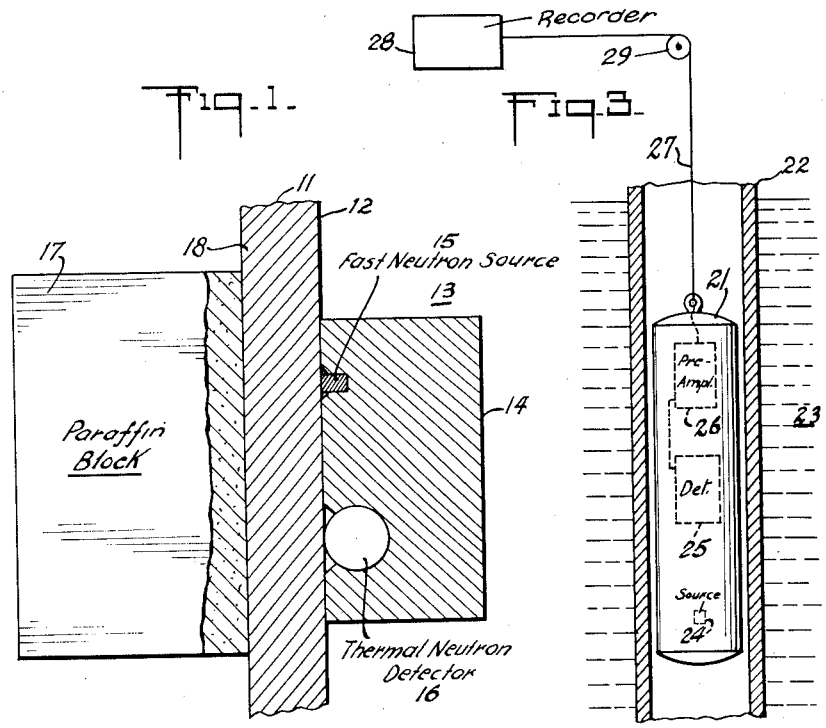
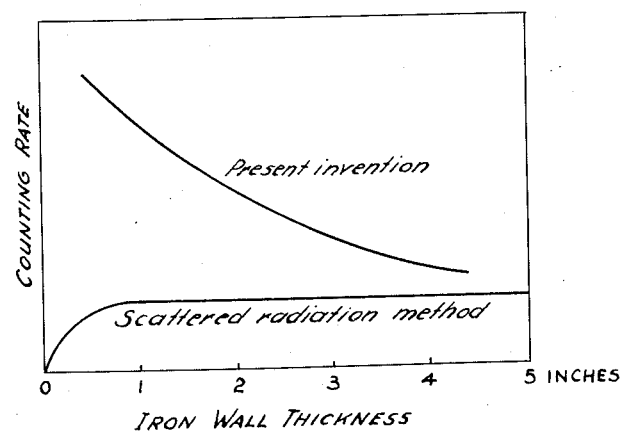

United States Patent Office 2,967,937
Patented Jan. 10, 1961

2,967,937

METHOD AND APPARATUS FOR MEASURING THICKNESS

Alexander S. McKay, Bellaire, Tex., assignor to Texaco Inc., a corporation of Delaware Filed Dec. 16, 1955, Ser. No. 553,565

18 Claims. (Cl. 250—83.1)

The present invention relates generally to thickness measurement and more particularly to method and apparatus for determining the thickness of various materials by means of a radioactivity technique.

It is a general object of the present invention to provide improved method and apparatus for determining the thickness of a substance by radioactivity techniques.

It is well known that the thickness of metal pipes and the like can be determined as a function of the scattering and transmission of penetrative radiation, particularly gamma rays, and the like. Methods and apparatus for such measurement are set forth, for example, in U.S. Patent No. 2,277,756, issued March 31, 1942 to D. G. C. Hare and reissued on August 22, 1944, as Re. 22,531.

While prior art radioactivity techniques for the measurement of thickness, such as those set forth in the Hare patent, supra, are quite useful, the effectiveness of these techniques decreases as the thickness of the wall to be measured goes beyond a certain point. Accordingly, it is an object of the present invention to provide improved thickness measuring apparatus and techniques having an improved effectiveness for relatively thick walls as compared to the aforementioned prior art methods and apparatus.

It is another object of the present invention to provide improved thickness measurement method and apparatus employing radioactivity principles and which is of comparatively simple design.

It is still another object of the present invention to provide an improved radioactivity type thickness measurement and apparatus suitable for measuring the thickness of a wall having one surface in contact with water.

It is often difficult to determine the thickness of metal plates such as those of a ship, particularly when the ship is immersed in water. Accordingly, it is an object of the present invention to provide thickness measurement apparatus and methods suitable for determining the thickness of the hull of a ship while it is immersed in water.

In general, the invention comprises a method and apparatus wherein penetrative radiation of a first type is transmitted through a substance whose thickness is to be determined and caused to intercept a medium wherein the radiation is converted into a second type of penetrative radiation, then returned through the substance and detected as an indication of the thickness of the substance.

Briefly stated, apparatus in accordance with a preferred aspect of the present invention may comprise a source of fast neutrons and a detector of thermal neutrons adapted and arranged to be positioned on one side of a substance whose thickness is to be determined and a moderator for producing slow neutrons in response to fast neutrons and which is adapted and arranged to be positioned on another side of a substance to be measured opposite the aforementioned source and detector.

In accordance with one mode of carrying out the present invention, a substance whose thickness is to be determined is irradiated with fast neutrons originating at a location on one side of the substance, whereby the fast neutrons are caused to penetrate the substance, and a hydrogenous material is positioned on the other side of the substance opposite the source of fast neutrons in order to intercept fast neutrons passing through the substance and convert them into thermal neutrons. Thermal neutrons produced in the hydrogenous material are then caused to irradiate the substance from said other side and pass through the substance to a location in the vicinity of the source of fast neutrons where they are detected by a thermal neutron detectors in order to determine the thickness of the substance as a function of the thermal neutron capture effect of the substance.

For additional objects and advantages, and for a better understanding of the invention, attention is now directed to the following description and accompanying drawing. The features of the invention which are believed to be novel are particularly pointed out in the appended claims.

Referring to the drawing:

Figure 1 is a side view, partly in cross-section, of apparatus which may be employed for measuring the thickness of a wall in accordance with the invention;

Figure 2 is a graph showing the form of a typical measurement in accordance with the present invention, and;

Figure 3 is a side view, partly in cross section, showing apparatus for measuring the thickness of the wall of piping that is surrounded by a hydrogenous liquid, such as water.

Referring now to Figure 1, there is shown a wall 11, which may be formed of iron or the like, whose thickness is to be determined. On one side 12 of the wall there is positioned a thickness measurement apparatus 13 comprising a housing 14 containing a source of fast neutrons 15 and a thermal neutron detector 16. The source of fast neutrons 15 may comprise, for example, a radium beryllium or polonium beryllium source or, alternatively, may comprise suitable electrical apparatus such as a linear accelerator capable of producing fast neutrons. The detector 16 may comprise a Geiger-Mueller tube, especially one of the multiple-cathode type, which may be operated in the proportional region and lined with boron carbide or filled with boron trifluoride gas, for example. Appropriate scintillation type detection apparatus sensitive to the desired thermal neutrons may also be employed. The housing 14 may function as a support for the source 15 and the detector 16 and also preferably serves as a radiation shield to protect the operator from the neutron and gamma radiation and also serves as a reflector of fast neutrons. In order to afford adequate shielding and reflection, therefore, the housing 14 should preferably be formed of gamma ray shielding material such as lead and appropriate fast neutron shielding material and should be of sufficient thickness to afford adequate shielding, in accordance with well-known practices of radiation safety. As will be appreciated by those skilled in the art, gamma-ray shielding material, such as lead, is not necessary in the case where a gamma ray free source of fast neutrons is employed.

A moderator 17, which may be formed of paraffin or other hydrogenous material, is positioned opposite the instrument 13 adjacent the side 18 of the wall 11. For purposes of portability, paraffin provides an excellent material for this purpose in view of its comparatively light weight and ease of handling in relation to its moderating powers. In accordance with other methods, different types of material may be employed for the moderator 17; for example, in the case where the wall 11 is normally located in contact with water, as in the case of the wall of a ship, the water may serve as the moderator. In any event, the moderator should preferably be of sufficient thickness to provide an effective source of thermal neutrons in response to fast neutrons incident thereupon from the source 15. Preferably, the thickness of the moderator should be at least that of six (6) inches of water or its equivalent in hydrogen content.

With further regard to the instrument 13, an appropriate cover shield (not shown) is preferably provided for shielding the source within the instrument when not in operation. Such a shield may comprise, for example, a sliding shutter that may be inserted over the opening in the housing 14 which contains the source 15.

In order to facilitate shielding, particularly while the apparatus is in operation, it is contemplated to recess the source 15 in a suitable slot in the housing 14.

In the operation of the present invention, fast neutrons traveling from the source 15 through the wall 11 to the moderator 17 will be effected very little by the presence of the metal wall 11. Although some of the fast neutrons may be slowed down and eventually captured in the moderator, many of the fast neutrons will produce thermal neutrons and sufficient numbers of the latter will diffuse back through the metal wall to the detector 16 to provide an effective indication of the thickness of the wall 11, in accordance with the invention. Inasmuch as thermal neutrons have a much higher capture cross-section in the wall 11 than the fast neutrons, the number of slow neutrons that reach the detector will depend primarily upon the thickness of the wall. Thus, the counting rate of the detector 16 decreases as the wall thickness increases. Actually, there are two reasons for this, namely, the absorption of the thermal neutrons and failure of thermal neutrons to reach the detector 16 caused by dispersion due to the actual distance between the effective source of the thermal neutrons (moderator) and the counter.

In practice, the device may be calibrated for a given material, such as iron, by examination of a sample of known, graduated thickness. Similarly, the instrument should be calibrated for each moderator of given hydrogenous content. In the case of a metal plate in contact with a large body of water, as for example in the case of a ship, both the moderating effect and the microscopic thermal neutron capture cross-section of the water in a given area will normally be substantially constant, thus facilitating calibration and subsequent measurement. Where the chlorine content of the water is high it may be necessary to reduce the spacing between the source and detector in order to obtain the best possible measurement under these conditions. In general the method should work better with a fresh water moderator than with salt water.

While the present invention is of particular utility for the measurement of comparatively thick walls formed of iron or steel or the like; nevertheless, it affords effective means for measuring the thickness of comparatively thin materials such as cadmium, indium, mercury, silver or the like, having a comparatively large capture cross-section for thermal neutrons. It is understood, therefore, that the invention may be employed to determine the thickness of various materials, as determined by their thermal neutron capture cross section in relation to thickness.

Referring now to Figure 2, there is shown a graph illustrating variations in counting rate with wall thickness, in accordance with the present technique. By contrast, there is also illustrated a graph showing variations in counting rate in the case of a scattered radiation measurement, as for example of the type employed in the above-mentioned Hare patent. It is noted that in the case of a thickness measurement by means of scattered radiation the counting rate increases as the wall thickness increases, whereas in the case of the present invention counting rate decreases as the wall thickness increases. Moreover, the present invention normally affords a more effective means for determining the thickness of relatively thick walls more effectively than is normally possible with the scattered method.

It is noted that, to some extent, it is possible that a few of the neutrons that are scattered back in the metal wall may be detected in the present case but this effect is substantially masked by the much higher counting rate caused by the thermal neutrons produced in the hydrogenous moderator.

Referring now in Figure 3, there is shown apparatus for determining the thickness of a conduit surrounded by a hydrogenous liquid, such as water or oil. In this illustration, a sonde 21 is shown within a metal conduit or pipe 22 surrounded by water 23. The sonde 21 contains a source of fast neutrons 24 and a detector of slow neutrons 25. The source 24 and detector 25 are positioned within the sonde 21 such that the source may effectively irradiate the conduit 22 with fast neutrons that pass through it and impinge upon the water 23 which serves as a moderator to produce thermal neutrons that are returned through the conduit 22 to the detector 25. The output of the detector 25 is coupled through appropriate electrical circuitry which may include a pre-amplifier 26 for enhancing the signal which may then be transmitted over a cable 27 to a recorder 28 located at the surface. It is to be understood that the recorder 28 may include suitable means for amplifying the signal transmitted from the preamplifier 26 over the cable 27. Appropriate equipment illustrated schematically as a measuring wheel 29 may also be provided for correlating the position of the sonde in the conduit with the measurement made thereby.

It is noted that the material comprising the sonde 21 should preferably be such as to effectively transmit fast neutrons through the conduit 22 to the water 23 and which permits thermal neutrons originating in the water 23 to return to the detector 25. An appropirate window in the sonde may serve this purpose. In any event, where the material comprising the sonde has an influence upon the transmittal of the fast and thermal neutrons, this effect will be substantially uniform and may be accounted for in the calibration of the apparatus.

It is noted with respect to the apparatus of Figure 3 that its operation requires that the liquid moderator be sufficiently thick adjacent the conduit in order to provide an effective moderator of substantially uniform hydrogenous content.

Among the advantages of the present invention is the fact that the source and detector may be located adjacent one another without undue interference where their respective operating ranges are sufficiently distinct, i.e., where the slowest neutron emitted by the source is above the detection threshold of the detector.

While certain specific embodiments have been shown and described, it will be understod that various modifications may be made without departing from the principles of the invention. The appended claims are, therefore, intended to cover any such modifications within the true spirit and scope of the invention.

I claim:

1. Apparatus for determining the thickness of a substance comprising a source of fast neutrons, a detector of thermal neutrons, a housing adapted and arranged to contain said source and said detector and adapted and arranged to be positioned on one side of a substance whose thickness is to be measured, a portable moderator comprising a predetermined quantity of an hydrogenous material adapted and arranged to be positioned on the opposite side of said substance, and indicating means associated with said detector for providing a signal display that is proportional to the counting rate of thermal neutrons detected thereby.

2. Apparatus as in claim 1, wherein the moderator comprises a predetermined quantity of paraffin.

3. The method of determining the thickness of a wall comprising the steps of producing fast neutrons adjacent the substance on one side thereof and transmitting said fast neutrons through said substance, intercepting and moderating said fast neutrons on the opposite side of said substance thereby producing thermal neutrons in response to said fast neutrons, transmitting said thermal neutrons from said other side of the substance to the said one side, detecting thermal neutrons on said one side, and providing a display that is proportional to the detected thermal neutron flux in order to determine the thickness of said wall.

4. The method of determining the thickness of a wall having one side in contact with a hydrogenous moderator comprising the steps of producing fast neutrons adjacent the wall on the side opposite the said moderator whereby fast neutrons are transmitted through said wall and caused to intercept the moderator thus producing moderated neutrons in the moderator which are caused to penetrate the wall, detecting thermal neutrons on the side remote from said moderator, and providing a display that is proportional to the detected thermal neutron flux in order to determine the thickness of said wall.

5. The method of claim 4 wherein said moderator is water.

6. The method of claim 4 wherein the wall to be measured is the wall of a ship and the moderator is water in which the ship is located.

7. The apparatus of claim 1 wherein substantially all of the neutrons emitted by the source are of higher energy range than the upper detection threshold of the thermal neutron detector.

8. The method of determining the thickness of a member having an hydrogenous moderator adjacent one side thereof comprising the steps of irradiating another side of said member with fast neutrons in such manner as to transmit fast neutrons through the member and cause the transmitted neutrons to impinge upon the moderator, thus producing moderated neutrons, some of which are emitted from the moderator and transmitted through the member to a side thereof opposite the moderator, detecting the moderated neutrons transmitted through said member to the side opposite the moderator, and providing a display that is proportional to the detected moderated neutron flux transmitted through said member as an indication of the thickness of said member.

9. The method of determining the thickness of a member which comprises positioning a neutron moderator on one side of said member, positioning a source of fast neutrons on another side of said member, positioning a detector of moderated neutrons on a side of said member opposite said moderator, transmitting fast neutrons from said source through the member to the moderator with the resultant production of moderated neutrons, some of which are emitted from the moderator and transmitted through said member to said detector, detecting moderated neutrons impinging upon said detector, and providing a display that is proportional to the detected moderated neutron flux reaching said detector as an indication of the thickness of said member.

10. The method of determining the thickness of an object comprising the steps of producing fast neutrons adjacent the object on one side thereof and transmitting said fast neutrons through said object, intercepting and moderating said fast neutrons on the opposite side of said object, thereby producing moderated neutrons in response to said fast neutrons, causing said moderated neutrons to irradiate said opposite side of the object whereby moderated neutrons are caused to penetrate said object, detecting radiation emitted from the side of said object opposite the side irradiated with moderated neutrons which is due to irradiation of the object by said moderated neutrons, and providing a display that is proportional to the detected radiation flux as an indication of the thickness of said object.

11. The method of measuring the thickness of a conduit surrounded by a substantial quantity of neutron moderating material of uniform hydrogenous content comprising the steps of passing an instrument through the conduit, which instrument contains a source of fast neutrons and a detector of moderated neutrons, transmitting fast neutrons from the source through the conduit into the hydrogenous moderator in order to produce moderated neutrons external to said conduit, whereby moderated neutrons are transmitted through the conduit to the interior thereof, detecting moderated neutrons impinging upon the detector within the conduit and providing a display that is proportional to the moderated neutron flux impinging upon the detector.

12. The method of determining the thickness of an object comprising the steps of producing fast neutrons adjacent the object on one side thereof and transmitting said fast neutrons through said object, intercepting and moderating said fast neutrons on the opposite side of said object, thereby producing moderated neutrons in response to said fast neutrons, causing said moderated neutrons to irradiate said opposite side of the object whereby moderated neutrons are caused to penetrate said object, detecting radiation emitted from said object which is due to irradiation of the object by said moderated neutrons, providing a signal that is proportional to the detected radiation flux, and correlating said signal with reference data obtained by performing the above recited steps with respect to a calibration standard as an indication of the thickness of said object.

13. The method of measuring the thickness of a conduit surrounded by a substantial quantity of neutron moderating material of uniform hydrogenous content comprising the steps of passing an instrument through the conduit, which instrument contains a source of fast neutrons and a detector of moderated neutrons, transmitting fast neutrons from the source through the conduit into the hydrogenous moderator in order to produce moderated neutrons external to said conduit, whereby moderated neutrons irradiate the conduit, detecting radiation emitted from said conduit as a result of the irradiation of the conduit by said moderated neutrons, providing a signal that is proportional to the detected radiation flux, and correlating said signal with reference data obtained by performing the above recited steps with respect to a calibration standard as an indication of the thickness of said conduit.

14. The method of claim 8 which further comprises correlating said signal display with calibration data obtained by performing the above-recited steps with respect to a calibration standard.

15. The method of claim 9 which further comprises correlating said signal display with calibration data obtained by performing the above-recited steps with respect to a calibration standard.

16. The method of claim 10 which further comprises correlating said signal display with calibration data obtained by performing the above-recited steps with respect to a calibration standard.

17. The method of claim 11 which further comprises correlating said signal display with calibration data obtained by performing the above-recited steps with respect to a calibration standard.

18. The method of claim 12 wherein the radiation detected essentially comprises moderated neutrons emitted from the object.

References Cited in the file of this patent

UNITED STATES PATENTS

| | | |
|---|---|---|
| 2,231,577 | Hare | Feb. 11, 1941 |
| 2,425,512 | Crumrine | Aug. 12, 1947 |

(Other references on following page)

UNITED STATES PATENTS

| | | |
|---|---|---|
| 2,425,533 | Herzog | Aug. 12, 1947 |
| 2,486,845 | Herzog | Nov. 1, 1949 |
| 2,652,496 | Herzog et al. | Sept. 15, 1953 |
| 2,769,097 | Lord | Oct. 30, 1956 |
| 2,769,918 | Tittle | Nov. 6, 1956 |

OTHER REFERENCES

Proceedings of The International Conference on The Peaceful Use of Atomic Energy, August 8–20, 1955; published in vol. 15, Application of Radioactive Isotopes and Fission Products in Research and Industry, pages 122, 127, 128, United Nations Publication.